United States Patent
Shibuya et al.

(10) Patent No.: US 7,714,540 B2
(45) Date of Patent: May 11, 2010

(54) APPARATUS AND METHOD FOR DETECTING VOLTAGE OF ASSEMBLED BATTERY

(75) Inventors: Nobuo Shibuya, Hiratsuka (JP); Yoshinao Tatebayashi, Yokohama (JP); Shinichiro Kosugi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 359 days.

(21) Appl. No.: 11/383,603

(22) Filed: May 16, 2006

(65) Prior Publication Data

US 2006/0261677 A1 Nov. 23, 2006

(30) Foreign Application Priority Data

May 17, 2005 (JP) ............... 2005-143576

(51) Int. Cl.
*H02J 7/14* (2006.01)
*H02J 7/00* (2006.01)

(52) U.S. Cl. ............ 320/119; 320/104; 320/116; 320/118; 320/134

(58) Field of Classification Search .......... 320/166, 320/116, 119
See application file for complete search history.

(56) References Cited

U.S. PATENT DOCUMENTS

| 5,073,751 | A  | * | 12/1991 | Kaitandjian et al. | ......... 320/166 |
| 6,323,623 | B1 | * | 11/2001 | Someya et al. | ............. 320/166 |
| 6,362,627 | B1 | * | 3/2002  | Shimamoto et al. | ........ 324/434 |
| 6,803,766 | B2 | * | 10/2004 | Kobayashi et al. | ......... 324/434 |

| 2005/0069739 | A1 |   | 3/2005  | Ozeki et al. |
| 2005/0079396 | A1 |   | 4/2005  | Ozeki et al. |
| 2005/0218900 | A1 | * | 10/2005 | Iwabuchi et al. ............ 324/426 |

FOREIGN PATENT DOCUMENTS

| JP | 9-274971       | 10/1997 |
| JP | 2000-199771    | 7/2000  |
| JP | 2001-56350     | 2/2001  |
| JP | 2001-201522    | 7/2001  |
| JP | 2003-32907     | 1/2003  |
| JP | 2005-91136     | 4/2005  |
| JP | 2005-116642    | 4/2005  |
| KR | 10-2001-0040039 | 5/2001 |
| KR | 10-2004-0004615 | 1/2004 |

OTHER PUBLICATIONS

U.S. Appl. No. 12/049,688, filed Mar. 17, 2008, Tatebayashi, et al.
U.S. Appl. No. 11/444,488, filed Jun. 1, 2006, Sanada et al.
U.S. Appl. No. 11/444,492, filed Jun. 1, 2006, Sanada et al.

* cited by examiner

*Primary Examiner*—Edward Tso
*Assistant Examiner*—Alexis Boateng
(74) *Attorney, Agent, or Firm*—Oblon, Spivak, McClelland, Maier & Neustadt, L.L.P.

(57) ABSTRACT

An assembled battery voltage detecting apparatus includes a sampling switch section which samples a voltage of each of single batteries, capacitors charged with voltages of single batteries, a transfer switch section to transfer a charge voltage charged in each of the capacitors, a ground potential setting switch section which, in the case of reading the voltage charged in the capacitor, connects a reference electric potential of the capacitor to a grounding terminal of a voltage detecting apparatus, and a voltage detecting circuit which controls a switching timing of each of the above switches, and then reads a voltage of each capacitor.

27 Claims, 9 Drawing Sheets

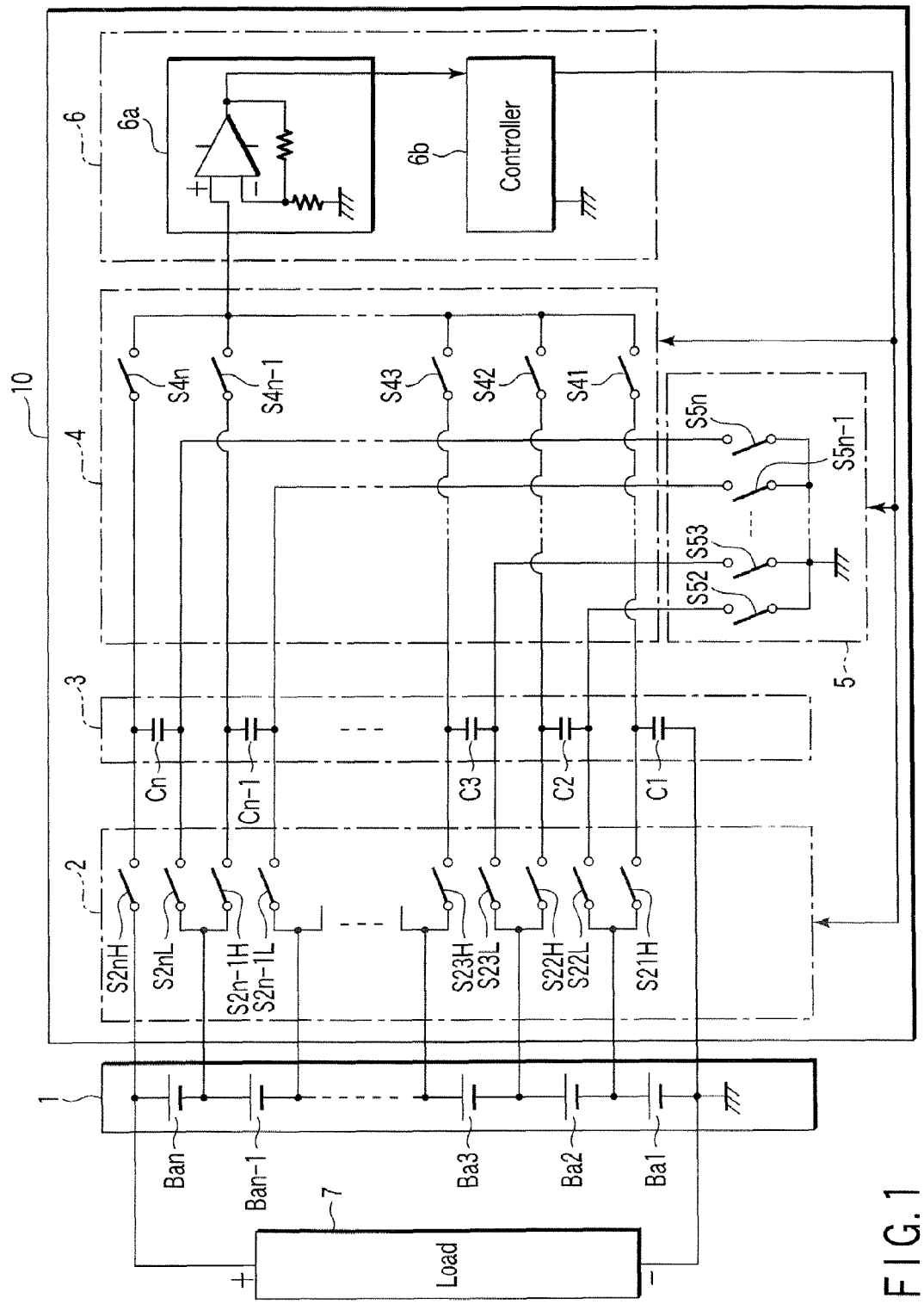
F I G. 1

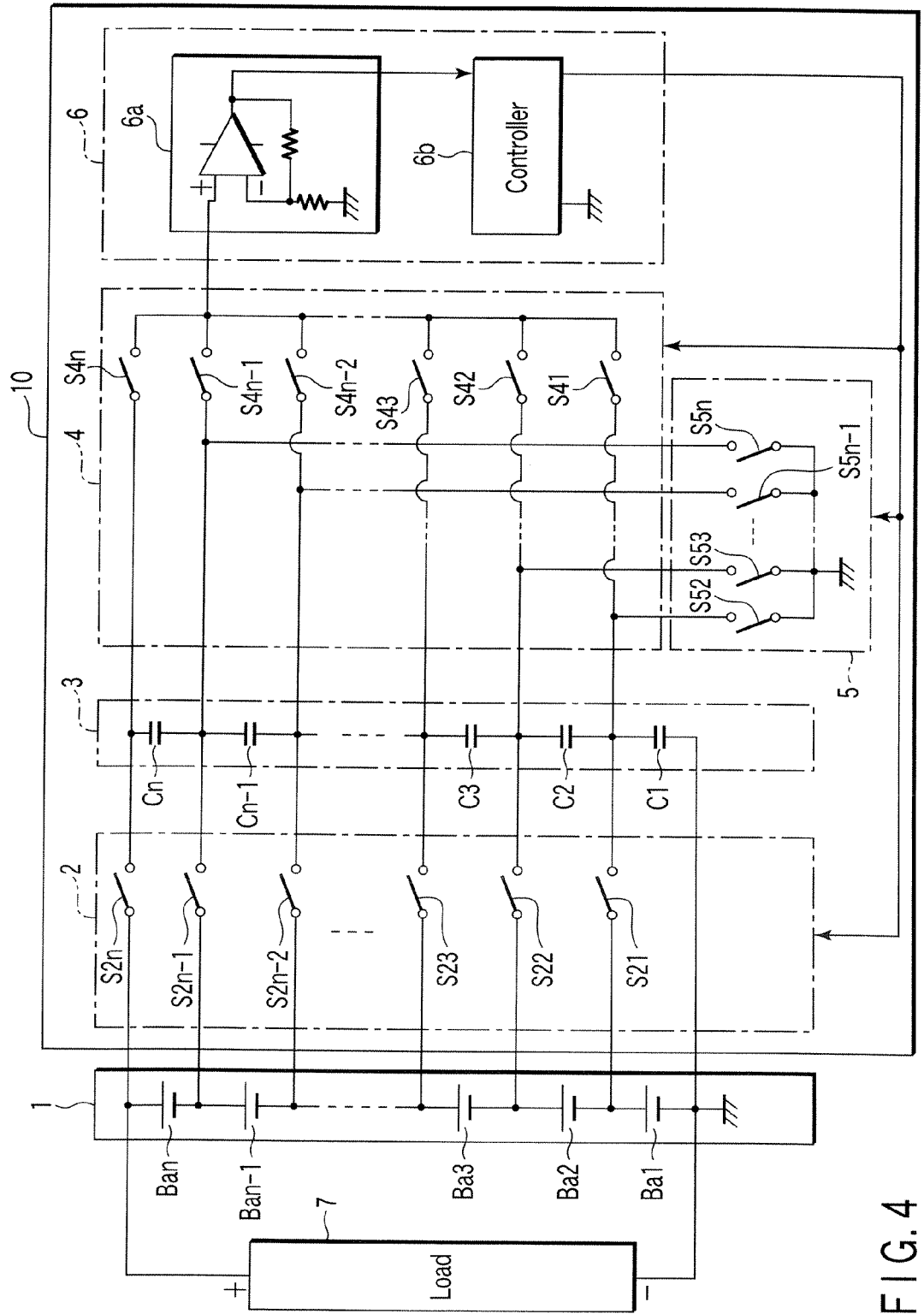
F I G. 4 ously detect voltages of single batteries with high accuracy.

APPARATUS AND METHOD FOR DETECTING VOLTAGE OF ASSEMBLED BATTERY

CROSS-REFERENCE TO RELATED APPLICATIONS

This application is based upon and claims the benefit of priority from prior Japanese Patent Application No. 2005-143576, filed May 17, 2005, the entire contents of which are incorporated herein by reference.

BACKGROUND OF THE INVENTION

1. Field of the Invention

The present invention relates to an apparatus and method for detecting a voltage of an assembled battery, and particularly to an apparatus and method for detecting voltages of single batteries in an assembled battery, the apparatus and method being capable of detecting a charge state of a number of single batteries.

2. Description of the Related Art

In an electric vehicle or in a hybrid electric vehicle (HEV), a motor is used as a driving power source. As an electric power source of such a motor, there are used an assembled battery made by serially connecting single batteries such as lithium secondary batteries, fuel batteries or the like.

In particular, the lithium secondary batteries are vulnerable to overcharging or over-discharging. If the batteries are not used at a voltage within a predetermined use range, there is a danger that they cannot be used because a material decomposes, a capacity is significantly lowered, and abnormal heating occurs.

Therefore, in the case where the lithium secondary batteries are used to form an assembled battery, it is required to sufficiently restrict and precisely detect dispersion in voltages of single batteries so as not to occur overcharging or over-discharging in single batteries that configure the assembled battery.

In addition, in the case of fuel batteries which do not require charging as well, it is required to precisely detect output voltages of all single batteries, prevent pole transfer, and prevent shutdown due to an excessive load in order to continuously and efficiently maintain electric power generation. In addition, it is also required to precisely detect output voltages of the fuel batteries in order to detect and control fuel jamming for continuously and efficiently maintaining electric power generation.

In the case of conventional lead batteries using a water soluble electrolyte or an assembled battery composed of single batteries such as nickel batteries, these batteries have properties that dispersion between single batteries is eliminated (uniformly charged) to a certain extent. Thus, over-discharging or overcharging of single batteries have been successfully prevented by monitoring a voltage across a certain single battery and controlling charging and discharging so that the monitored voltage is maintained in a predetermined voltage range.

However, in an assembled battery using lithium batteries as single batteries, the assembled battery being composed by using an organic electrolyte, uniform charging is not carried out under such a control. Thus, it is known that dispersion between single batteries expands, and overcharging or over-discharging of single batteries proceeds, causing performance deterioration such that an unusable state occurs.

Therefore, in a conventional assembled battery using lithium batteries as single batteries, there is provided a charge state detecting apparatus for detecting whether or not a charge state of each of the single batteries as shown in FIG. 8 is controlled to be charged or discharged within a predetermined set voltage range, i.e., abnormal overcharging or over-discharging that exceeds the predetermined set voltage range (for example, refer to FIG. 1 and page 1 of Jpn. Pat. Appln. KOKAI Publication No. 2003-32907).

This charge state detecting apparatus is comprised of; a voltage detecting circuit 15a for detecting overcharging or over-discharging of single batteries in an assembled battery 11 made of a number of single batteries Ba1 to Ban; and an overcharging or over-discharging judging circuit 15b equipped with a logic circuit for judging overcharging or over-discharging from an output of the detecting circuit.

In addition, in the voltage detecting circuit 15a, there are provided, by number of single batteries, resistors RUa and RUb of a voltage dividing circuit for supplying a voltage to judge overcharging by single batteries; resistors RLa and RLb of a voltage dividing circuit for supplying a voltage to judge over-discharging; a constant voltage circuit Er for setting a comparator voltage to judge overcharging or over-discharging; a differential amplifier COU for detecting overcharging from the voltages supplied from these voltage dividing circuits and the comparator voltage set by the constant voltage circuit Er; and a differential amplifier COL for detecting over-discharging.

Further, each one of the differential amplifier COU and the differential amplifier COL is placed at an electric potential with respect to the ground potential, which differs from single battery to battery. Thus, offset voltages of the differential amplifiers COU and COL themselves and an effect of a voltage error of the respective constant voltage circuits Er for setting a reference voltage to be compared cannot be ignored, and there is a problem that the adjustment for controlling the voltage error becomes complicated. Thus, a configuration of this charge state detecting apparatus becomes complicated and expensive, and the detecting apparatus has been unsuitable for voltage detection of an assembled battery made of a number of single batteries.

In contrast with such a charge state detector section for an assembled battery, there is provided a voltage detecting apparatus for an assembled battery having a configuration, called a flying capacitor system, such that reference electric potentials of single batteries Ba1 to Ban, are fixed to a ground potential so as not to be affected by the different reference voltages and such that the number of differential amplifier circuits COU, differential amplifier circuits COL, and voltage setting parts is reduced for judging the above-described overcharging or over-discharging (for example, refer to FIG. 1 and page 1 in Jpn. Pat. Appln. KOKAI Publication No. 2001-201522).

This flying capacitor system is featured by reducing an effect of a parasitic capacitance of a sampling switch section 22 made of a plurality of switches for changing a connection destination of a capacitor for charging each of the single batteries Ba1 to Ban and detecting a voltage of each of the single batteries with high precision.

This voltage detecting apparatus is configured as shown in FIG. 9, and comprises a sampling switch section 22 for sampling voltages of the single batteries Ba1 to Ban of an assembled battery 11 at a capacitor C; a transfer switch section 24 for transferring each of the single battery voltages charged in the capacitor C; a voltage detecting circuit 25 for detecting a charge voltage of the capacitor C; and a controller 26 for controlling a switching timing of each switch of the sampling switch section 22 and the transfer switch section 24 so as to reduce an effect of the parasitic capacitance, and then, detecting abnormal over-discharging or overcharging from an output of one voltage detecting circuit 25.

In this system, in the case of measuring a voltage of the single battery Ban of the assembled battery 11, for example, a sampling switch S22$n$L and a sampling switch S22$n$H are first closed at the same time, and the capacitor C is sampled and held or charged with the voltage of the single battery Ban.

Next, the sampling switch S22$n$L and the sampling switch S22$n$H are opened at the same time. Then, a ground potential setting switch S24L is closed. After the lower side of the capacitor C has been transferred to the ground potential, the switch S24H is closed with a slight delay. At this time, a charge voltage of the capacitor C is detected by means of the voltage detecting circuit 25, and the switch S24L and switch S24H are opened at the same time.

Then, this operation is sequentially made with respect to all of the single batteries Ban-1 to Ba1 one by one so as to detect the presence or absence of overcharging or over-discharging with respect to each of the single batteries.

However, in the case of a charge voltage detecting apparatus shown in FIG. 9, the voltages of the single batteries Ba1 to Ban are sequentially charged and detected with respect to one capacitor C. That is, the capacitor C is charged while sampling switches S221L to S22$n$H are sequentially switched, and a voltage of the charged capacitor C is read out, thereby obtaining the voltages of the single batteries Ba1 to Ban. However, in such a flying capacitor system, in the case where a load current of the assembled battery fluctuates while detection of charge voltages is carried out with respect to all the single batteries, there is a problem that dispersion in individual voltages cannot be precisely obtained.

That is, in the voltage detecting circuit, it is important to precisely obtain dispersion in voltages of the single batteries Ba1 to Ban. However, a sampling time is different from another one, in the case where a load current has changed, the voltages of the single batteries Ba1 to Ban having different internal resistances change, thus making it impossible to correctly obtain a difference in relative voltages of the single batteries Ba1 to Ban.

BRIEF SUMMARY OF THE INVENTION

According to one aspect of the present invention, there is provided an assembled battery voltage detecting apparatus, comprising: a plurality of capacitors provided in pairs with single batteries of an assembled battery made by connecting the single batteries in series; a plurality of sampling switches connected between one end of the each capacitor and one end of the single battery paired with the capacitor and between the other end of the capacitor and the other end of the single battery paired with the capacitor; a voltage detection control unit which measures a voltage charged with each capacitor from a single battery via the sampling switch; a plurality of transfer switches, each of which is connected between one end of the capacitor and the voltage detection control unit; and a plurality of reference electric potential setting switches, each of which is connected between the other end of the capacitor and a terminal of a ground potential.

According to another aspect of the present invention, there is provided an assembled battery voltage detecting apparatus, comprising: a plurality of capacitors provided in pairs with and in identical number with each single battery of an assembled battery made by connecting a plurality of single batteries in series, the capacitors being charged to sample a voltage of the each single battery; a plurality of sampling switches, each of which is provided between the single battery and the capacitor, the sampling switches sampling a voltage of the each single battery at the capacitor by switching a high electric potential side and a low electric potential side of the each single battery at the same time; a transfer switch which, in a state in which each sampling switch is opened after the end of the sampling, individually switches and transfers a charge voltage of the each capacitor; a reference electric potential setting switch which, in the case where a charge voltage of the each capacitor is transferred by means of the transfer switch, individually connects a low electric potential side of the each capacitor to a reference electric potential terminal of the voltage detecting apparatus; and voltage detecting unit for controlling a switching timing of each switch of the sampling switch, the transfer switch, and the ground potential setting switch, and then, reading a charge voltage of the each capacitor, the charge voltage being transferred by means of the transfer switch.

According to still another aspect of the present invention, there is provided a method for detecting a voltage of an assembled battery made by connecting a plurality of single batteries in series, the method comprising the steps of: charging a plurality of capacitors, each of which is provided in association with the each single battery, at a identical timing at a voltage of the each single battery; and reading a charge voltage for each of the capacitors in a state in which a low electric potential side of the each capacitor is connected to a reference electric potential terminal.

According to still further aspect of the present invention, by voltages of single batteries that configure an assembled battery, the corresponding capacitors are charged at the same timing so as to read out the charge voltage of each capacitor in a state in which a low level electric potential side of the charge voltage of the charged capacitor is connected to a ground potential of the voltage detecting apparatus.

That is, the voltages of single batteries are charged in capacitors in a state in which a load current of the assembled battery has a value at a time, so as to measure the voltages of the charged capacitors. Therefore, there can be provided an apparatus and method for detecting a voltage of an assembled battery, the apparatus and method being capable of relatively detecting dispersion in voltages of single batteries with high precision even if a load current of the assembled battery fluctuates in a period of time.

BRIEF DESCRIPTION OF THE SEVERAL VIEWS OF THE DRAWING

FIG. 1 shows a block diagram of a first embodiment according to the present invention;

FIG. 4 shows a block diagram of a second embodiment according to the present invention;

DETAILED DESCRIPTION OF THE INVENTION

Hereinafter, embodiments of the present invention will be described with reference to the accompanying drawings.

First Embodiment

Figure 2:
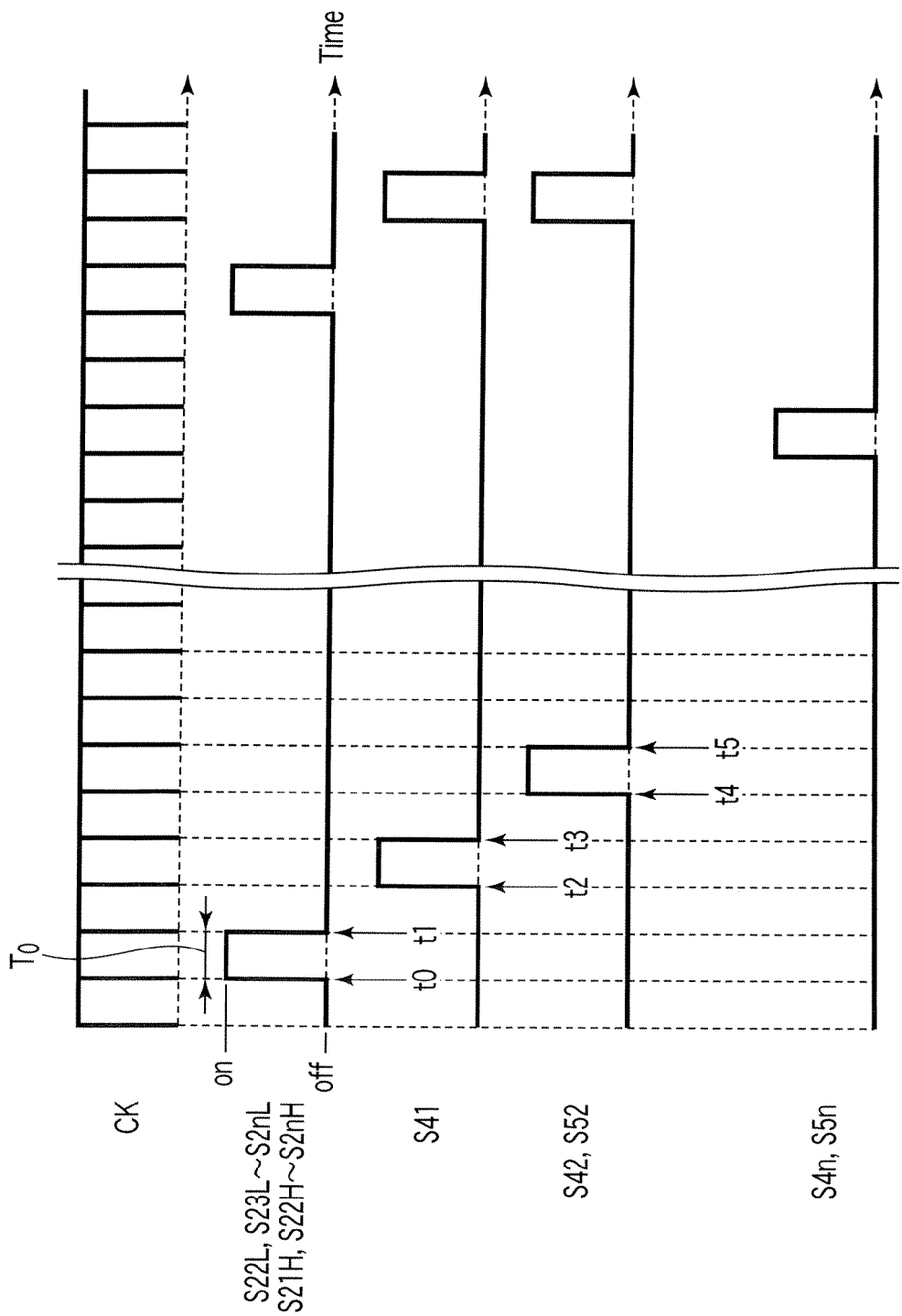
FIG. 2 is an illustrative view showing a switch operation timing of the first embodiment.
Figure 3:
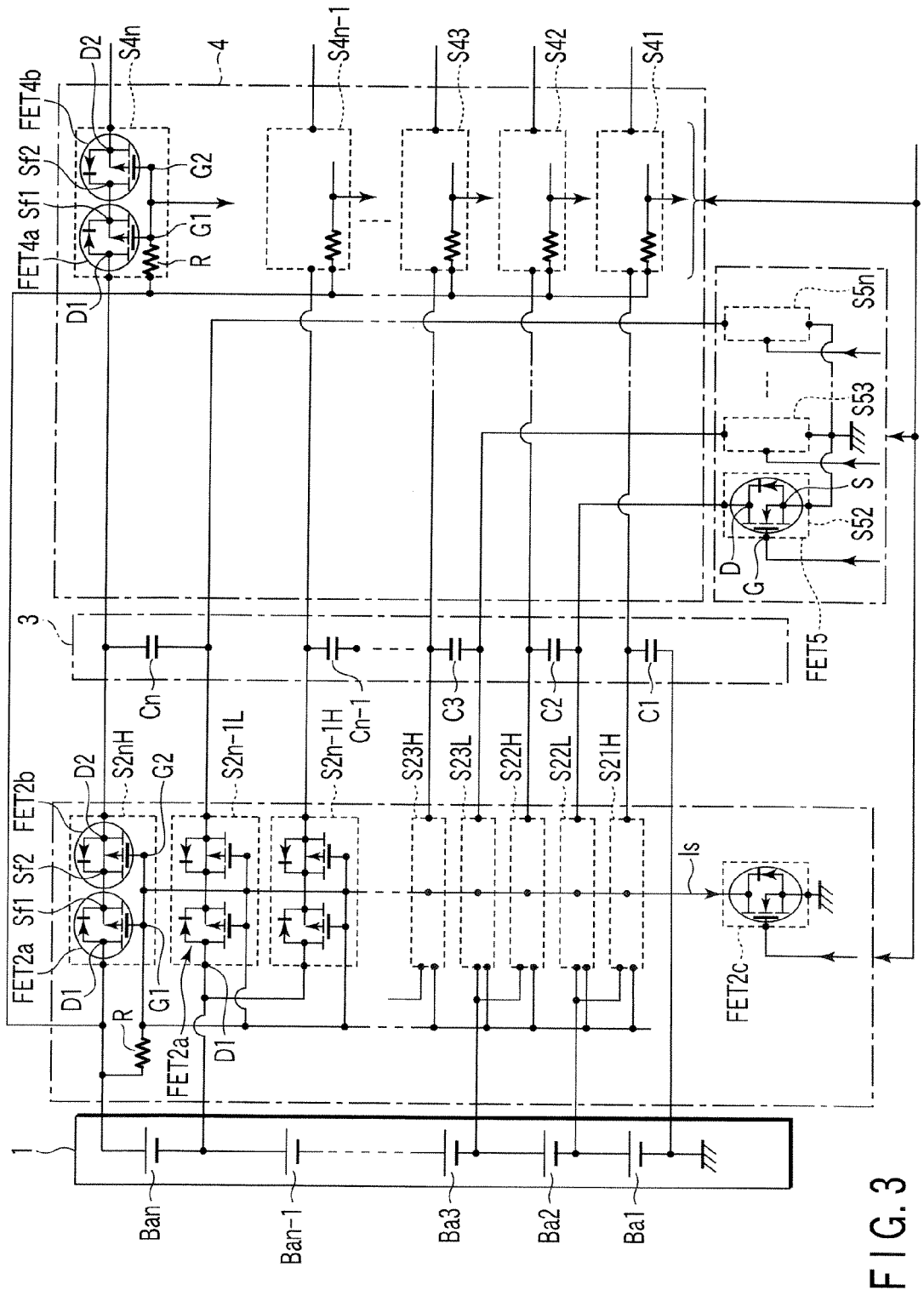
FIG. 3 is an illustrative view showing an electronic switch of the first embodiment.

With reference to FIGS. 1 to 3, a description will be given with respect to a first embodiment of an assembled battery voltage detecting apparatus 10 according to the present invention. FIG. 1 is a block diagram showing the first embodiment of the assembled battery voltage detecting apparatus 10 according to the present invention.

The assembled battery voltage detecting apparatus 10 comprises: an assembled battery 1 made by connecting in series a plurality of single batteries Ba1 to Ban to supply electric power to a load 7 (hereinafter, simply referred to as single battery Ba in the case where there is no need for distinguishably assigning single battery numbers 1 to n); a sampling switch section 2 for sampling a voltage of each single battery Ba; a capacitor section 3 equipped with individually charging capacitors C1 to Cn in response to the single batteries Ba1 to Ban sampled at the sampling switch section 2 (hereinafter, referred to as capacitor C in the case where there is no need for distinguishably assigning capacitor numbers 1 to n); a transfer switch section 4 for transferring a voltage of each single battery Ba charged in each capacitor C; and a ground potential setting switch section 5 for connecting a lower potential side of each capacitor C to a grounding terminal of the voltage detecting apparatus 10. Hereinafter, the switches are referred to as switches S2, S4 and S5 in the case where there is no need for distinguishably assigning the numbers 1 to n, respectively, as described in the following.

Further, the detecting apparatus is composed of a voltage detection control section 6 for controlling a switching timing of each switch of the sampling switch section 2, the transfer switch section 4 and the ground potential setting switch section 5, and then, reading a charge voltage of each single battery Ba sampled and held in each capacitor C.

Here, a sampling switch S2, capacitor C, a transfer switch S4, and a ground potential setting switch S5 of the sampling switch section 2 provided in association with "n" single batteries Ba, for example of an n–1-th single battery Ban–1, are designated by the corresponding numbers n–1. Namely, the corresponding sampling switch is designated by a sampling switch S2n–1; the corresponding capacitor is designated by a capacitor Cn–1; the corresponding transfer switch is designated by a transfer switch S4n–1; and the corresponding ground potential setting switch is designated by a ground potential setting switch S5n–1.

In addition, these switches each are composed of single pole switches. With respect to the sampling switch S2, differences of the corresponding electric potential positions are designated by assigning H or L which immediately follows switch numbers or by continuously assigning signs H and L. For example, a sampling switch connected to a high electric potential side (H) of an n–1-th single battery Ban is designated by a sampling switch S2n–1H; a sampling switch connected to a low electric potential side (L) is designated by a sampling switch S2n–1L.

In addition, each sampling switch is merely designated without numbers and signs corresponding thereto such as sampling switch S2 in the case where its numbers 1 to n and signs H or L indicating a high or low electric potential position are designated indistinguishably.

Similarly, the transfer switch and the ground potential setting switch are designated without numbers such as a transfer switch S4 and a ground electric potential setting switch S5 in the case where there is no need for distinguishably assigning the corresponding numbers 1 to n.

Now, a detailed description of each section will be given here. "n" single batteries, single batteries Ba1 to Ban are connected in series; a low electric potential terminal of the single battery Ba1 is connected to a grounding terminal of a load 7; and the high potential terminal of the single battery Ban is connected to the highest electric potential side of the load 7, respectively. In addition, the low electric potential terminal of the single battery Ba1 is connected to a grounding terminal of the voltage detecting apparatus 10.

In addition, sampling switches S2 composed of single pole switches are provided in response to the number of single batteries Ba1 to single batteries Ban independently at the high electric potential side and the low electric potential side of each single battery Ba.

For example, as shown in FIG. 1, in the case of an n–1-th single battery Ban–1, a sampling switch S2n–1H at its high electric potential side and a sampling switch S2n–1L at its low electric potential side are provided.

However, in the case of the single battery Ba1 always connected to a grounding terminal of the voltage detecting apparatus 10 at a low electric potential side, a sampling switch S1nL is eliminated, and only a sampling switch S21H at a high electric potential side is provided.

Common terminals of sampling switches S2 are connected to a high electric potential terminal and a low electric potential terminal of the corresponding single batteries Ba, respectively. Make terminals of the sampling switches S2 are connected to a high electric potential terminal and a low electric potential terminal of the corresponding capacitors C, respectively.

Therefore, common terminals of the sampling switches S2 of the high electric potential terminal and the low electric potential terminal are connected to each other at a connection point of two adjacent single batteries of the batteries Ba2 to Ban–1, whose high electric potential terminal and low electric potential terminal are connected to each other.

In addition, the high electric potential terminals of capacitors C1 to Cn are connected to common terminals of the corresponding transfer switches S41 to S4n, respectively. All of the make terminals of the transfer switches S4 are connected to each other, and then, are connected to an input end of a buffer amplifier 6a of a voltage detection control section 6.

In addition, the low electric potential terminals of the capacitors C2 to Cn are connected to make contact terminals of the corresponding ground potential setting switches S52 to S5n, respectively. All of the common terminals of the ground potential setting switches S52 to S5n are connected to a ground terminal of the voltage detecting apparatus 10.

Then, the low electric potential terminal of the capacitor C1 is connected to the grounding terminal of this voltage detecting apparatus 10.

The voltage detection control section 6 is composed of: a buffer amplifier 6a for amplifying a charge voltage of each of the capacitors C1 to Cn, the charge voltage being transferred between the transfer switch section 4 and the ground potential setting switch section 5; and a controller 6b for controlling a switching timing of each switch of each of the sampling switch 2, the transfer switch section 4 and the ground potential setting switch section 5 and converting an output of the buffer amplifier 6a to a digital signal to read a voltage of each single battery Ba.

Now, with reference to FIG. 2, a description will be given with respect to an operation of the thus configured assembled battery voltage detecting apparatus 10.

FIG. 2 is a timing chart showing a control operation for the controller 6b to control a switching timing of each of the sampling switch 2, the transfer switch S4 and the ground potential setting switch S5, and then, reading a voltage of each single battery Ba.

CK denotes a clock signal of the controller 6b. Switching operation of each section is controlled in synchronism with this clock signal CK.

First, with respect to voltages of single batteries Ba of the assembled battery 1 connected to a load 7 at a time t0, closing (making) all of the sampling switches S2 are carried out at the same time, and the corresponding capacitors C1 to Cn are simultaneously charged until a time t1 is reached.

With respect to a charging time T0 (=time t1−time t0), a sufficiently long time at which a time constant determined by an internal resistance of each single battery Ba and a capacitance of each capacitor C can be ignored is preset so that a charge voltage of each single battery Ba is not affected by the charging time T0.

Even if a load fluctuation occurs during this charging time T0, measurement is carried out at the same time interval, i.e., in the same battery current supplied to the load 7. Thus, whether the charging time T0 is long or short does not affect relative voltage detection of each battery Ba.

Next, opening (breaking) of all of the sampling switches S2 is carried out at the time t1, each single battery Ba and each capacitor C are disconnected from each other, and holding of the sampled voltage of each single battery is carried out in each capacitor.

Next, at a time t2, a transfer switch S41 is closed with a delay of one clock signal CK. Then, a charge voltage around a ground potential charged in a first capacitor C1 is read by means of the controller 6b via the buffer amplifier 6a before a time t3 is reached.

Next, at a time t3, the transfer switch S41 is opened. Further, a ground potential setting switch S52 and a transfer switch S42 are closed at a time t4 with a delay of one clock signal CK. Then, a voltage of a single battery Ba2 charged in a capacitor C2 with respect to the ground potential as a reference potential is read by means of the controller 6b via the buffer amplifier 6a until a time t5 is reached.

Then, this operation is sequentially repeated. The low electric potential terminal of each capacitor C is connected to a grounding terminal of the voltage detecting apparatus 10 by means of a ground potential setting switch S5, thereby providing a strict ground potential. In addition, the high electric potential side of each capacitor C is selected by means of the transfer switch S4, and the charge voltage of each capacitor C is read. This reading sequence can be arbitrarily changed during measurement.

Now, with reference to FIG. 3, a description will be given with respect to a detailed setting example of the sampling switch S2 and the transfer switch S4 responsible for such switching control; and the ground potential setting switch S5.

Each of the sampling switch S2, transfer switch S4, and ground potential setting switch S5 is required to be small in size and to be a switch equipped with a sufficiently high OFF resistance so that a leakage current of the switch does not affect voltage reading of a single battery Ba. Thus, for example, a MOS type FET (Metal Oxide Semiconductor Field Effect Transistor) switch is used as shown in FIG. 3.

Each of these sampling switches S2 is configured by using a P-channel MOS type FET. Hereinafter, the above MOS type FET is simply referred to as FET for the purpose of simplification. As shown in FIG. 3, for example, a source electrode Sf1 (hereinafter, referred to as a source) of FET2a and a source Sf2 of FET2b configuring a sampling switch S2nH, for example, are connected to be opposed to each other, and a gate electrode G1 (hereinafter, referred to as a gate) of FET2a is connected to a gate G2 of FET2b. Similarly, the gate G1 and the gate G2 of two FETs, each of which configures the sampling switch S2, are connected to each other. Connection terminals of the gate G1 and the gate G2 in each sampling switch are connected to one terminal of a resistor R of a high resistance value, and the other terminal of the resistor R is connected to the highest electric potential terminal of the assembled battery 1.

Then, for example, a drain electrode D1 (hereinafter, referred to as a drain) of one FET2a configuring the sampling switch S2nH, for example, is connected to a high electric potential terminal of a single battery Ban. A drain D1 of one FET2a configuring a sampling switch S2n−1L is connected to a low electric potential terminal of the single battery Ban. Similarly, a drain D1 of one of the two FETs configuring each sampling switch S2 is connected to a high electric potential end and a low electric potential terminal of each single battery Ba.

In addition, a drain D2 of the other FET2b configuring each sampling switch S2 is connected to a high electric potential terminal and a low electric potential terminal of each capacitor C.

In addition, the gates G1 and the gates G2 of all pairs of FET2a and FET2b configuring each sampling switch S2 are connected to a drain of FET2c. Then, electrically conductive states of all of FET2a and FET2b are controlled simultaneously by means of a switching control signal from the controller 6b supplied to a gate of FET2c.

At this time, a bias current "Is" is supplied to FET2c in order to turn ON all of FET2a and FET2b configuring all of the sampling switches S2 at the same time. This bias current "Is" flows out of the highest electric potential terminal of the assembled battery 1 via a high resistor R. Thus, a current that flows through batteries Ba connected in series is obtained as the same value of the bias current "Is" in all of the single batteries Ba.

In addition, in FET2a and FET2b, the respective sources are connected to each other, i.e., these transistors are connected to each other in an opposite direction. Thus, the parasitic diodes of FET2a and FET2b are also oriented in an opposite direction. Therefore, in the case where any of a drain D1 of FET2a and a drain D2 of FET2b is set at a high electric potential as well, a leak current is prevented from flowing through FET2a and FET2b by the presence of the parasitic diodes.

In addition, the transfer switch S4 is also composed of a P-channel MOS type FET. For example, in a transfer switch S4n, two FET4a and FET4b are connected to a source Sf1 of FET4a and a source Sf2 of FET4b, as shown in the figure, and a gate G1 of FET4a and a gate G2 of FET4b are connected to each other. The other transfer switches S4 are connected similarly, and the gate G1 and the gate G2 in the respective transfer switches S4 are connected in common to one terminal of each resistor R of a high resistance value. All of the other terminals of the resistors R are connected in common to the highest electric potential of the assembled battery 1.

Therefore, turn-ON currents of each sampling switch S2 and each transfer switch S4 flow equally through all single batteries Ba.

In contrast, instead of connecting a gate electrode of FET of each sampling switch S2 or each transfer switch S4 to a single battery Ba, in the case where the gate electrode is connected via a resistor to a drain electrode of FET of that sampling switch S2, the turn-ON current of the sampling switch S2 or the transfer switch S4 flows only through a single battery Ba having a lower electric potential than that of that single battery Ba. Thus, non-uniformity will occur between the single batteries Ba. In the present embodiment, such non-uniformity can be prevented.

Then, a drain D1 of FET4$a$ is connected to a high electric potential terminal of each capacitor C, and a drain D2 of FET4$b$ is connected to an input terminal of a buffer amplifier 6$a$ shown in FIG. 1.

Then, the gate G1 and the gate G2 of FET4$a$ and FET4$b$ configuring each transfer switch S4 are controlled to be opened or closed at different timings by means of a control signal transmitted from the controller 6$b$.

In addition, the ground potential setting switch S5, as shown in FIG. 3, is composed of an N-channel MOS type FET 5; a source S is connected to a grounding terminal, and a drain D is connected to a lower potential side of each capacitor C.

In each ground potential setting switch S5, an electric potential of the drain D is always set at a positive electric potential. Thus, the charge voltage of each capacitor C is obtained as a reversely biased voltage relevant to a parasitic diode of one N-channel MOS type FET 5. Therefore, there is no danger that an electric charge of the capacitor C leaks via this parasitic diode.

According to the first embodiment, making of the sampling switches S2 is carried out at the same time, the voltage of each single battery Ba is charged in each capacitor C corresponding thereto, and the lower potential side of each charged capacitor C is connected to a grounding terminal of the voltage detecting apparatus 10 so as to sequentially read the voltage. In this way, each capacitor C is charged in a state during which the same load current flows through each single battery Ba. Thus, there does not occur a fluctuation in charge voltage of each capacitor C due to a difference in load current, and a relative voltage of each single battery Ba can be precisely detected.

In the case of reading a charge voltage, the lower potential terminal of each capacitor C is fixedly connected to the grounding terminal so as to read correctly a reference electric potential, thus making it possible to measure a voltage without being affected by a floating capacitance or the like.

In addition, with a configuration of the present embodiment, even if dispersion occurs with the capacitive value of each capacitor, i.e., with a charging time constant, the charge voltage is not affected by the dispersion, thus making it easy to select parts configuring the voltage detection circuit.

Further, the sampling switch S2 and the transfer switch S4 are connected to each other while two P-channel MOS type FETs are opposed to each other, and two parasitic diodes of an FET switch serving as a symmetrical switch arrangement are connected to each other at reverse polarities. Thus, a leak current is reduced. In addition, all of the lead-in currents to a gate circuit due to opening and closing of a gate electrode are supplied under the same condition. Therefore, there can be provided a method and apparatus for detecting a voltage of an assembled battery capable of detecting a relative value of each single battery with high precision while reducing an effect of a leak current of a switch.

Second Embodiment

A second embodiment of the present invention will be described with reference to FIGS. 4 and 5. FIG. 4 is a block diagram showing an assembled battery voltage detecting apparatus 10 according to the second embodiment of the present invention. With respect to constituent elements of the second embodiment, the same constituent elements as those of the voltage detecting apparatus 10 according to the first embodiment shown in FIG. 1 are designated by the same reference numerals. A duplicate description thereof is omitted here.

The second embodiment is different from the first embodiment in the following. In the first embodiment, as a sampling switch section 2, sampling switches S21H to S2$n$H each have been provided at a high electric potential side of each single battery Ba; and sampling switches S22L to S2$n$L each have been provided at a low electric potential side independently, respectively. In contrast, in the second embodiment, sampling switches S21 to S2$n$ are connected at only a high electric potential side, and a switch at a low electric potential side is eliminated, whereby the number of switches is reduced to half.

Then, capacitors C1 to C$n$ are connected in series in the same manner as that of single batteries Ba1 to Ba$n$.

Figure 5:
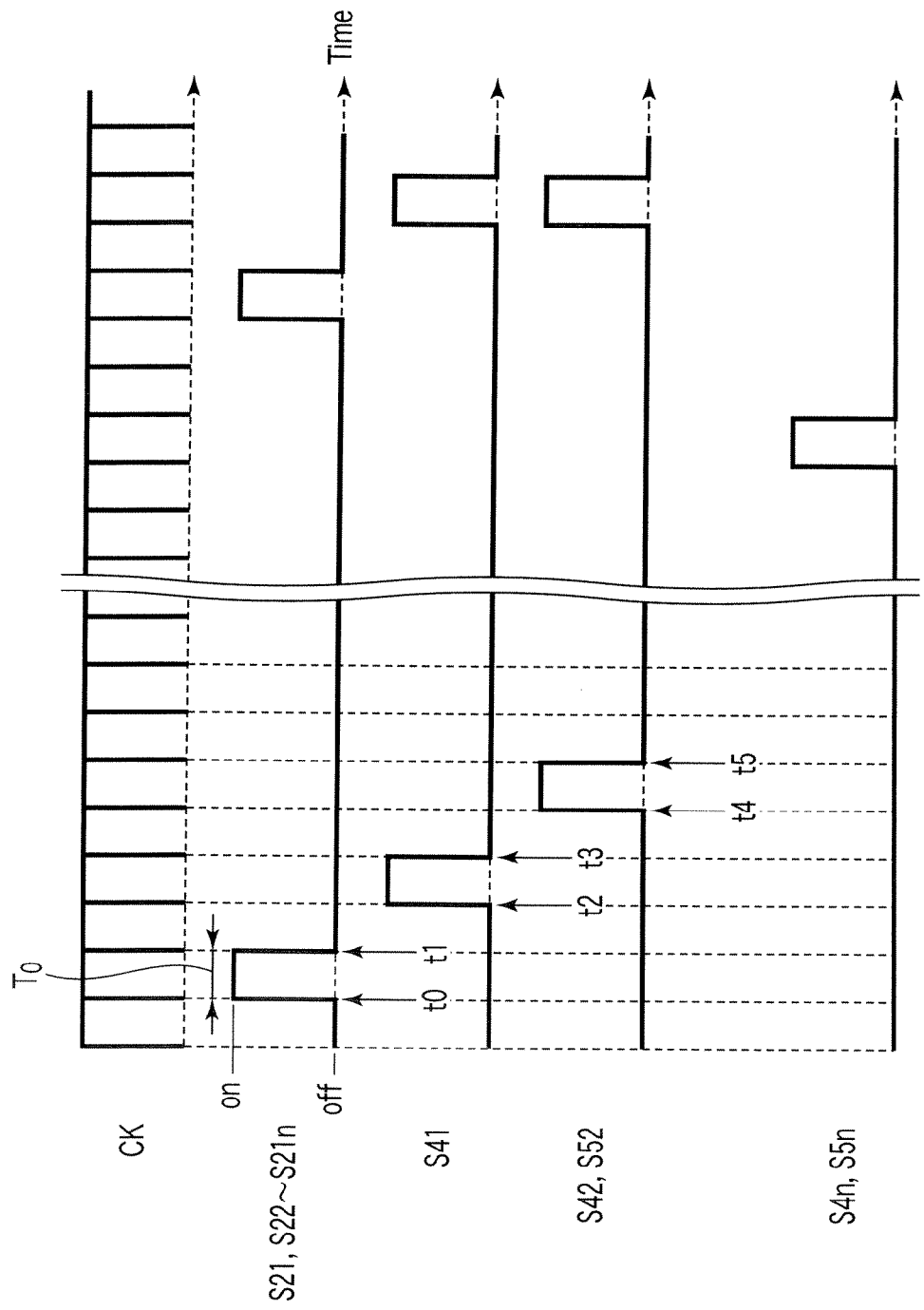
FIG. 5 is an illustrative view showing a switch operation timing of the second embodiment.

In switching control at a controller 6$b$ according to the second embodiment, such control can be made by means of a signal at the same timing as that in the first embodiment, as shown in FIG. 5.

However, in the second embodiment, in the case where a sampling switch S2 is in an open state, among two adjacent capacitors C, a lower potential terminal of a higher potential side capacitor (C2, for example) and a higher potential terminal of a lower potential side capacitor (C1, for example) are always connected to each other. Thus, in the case where a charge voltage of each capacitor C is read out by means of a voltage detection control section 6, control is made so as to read out in ascending order from the lowest positioned capacitor C placed at the lower potential side of the assembled battery 1.

That is, as shown in FIG. 5, first, making of a transfer switch S41 is carried out, and a charge voltage of a capacitor C1 is read out between a time t2 and a time t3. Next, the lower potential side of a capacitor C2 is controlled so as to read out a charge voltage of the capacitor C2 between a time t4 and a time t5 while a ground potential setting switch S52 and a transfer switch S42 are closed.

At this time, in order to eliminate an unstable state of a ground potential of each capacitor C due to a floating capacitance, it is preferable that the ground potential setting switch S52 be closed, the electric potential of the lower potential terminal of each capacitor C2 is transferred to a ground potential, and then, control be made so as to make the switch S42 with a slight delay.

In this manner, according to the second embodiment, there can be provided an assembled battery voltage detecting apparatus 10 in which the number of sampling switches S2 is reduced to be half.

Third Embodiment

Figure 6:
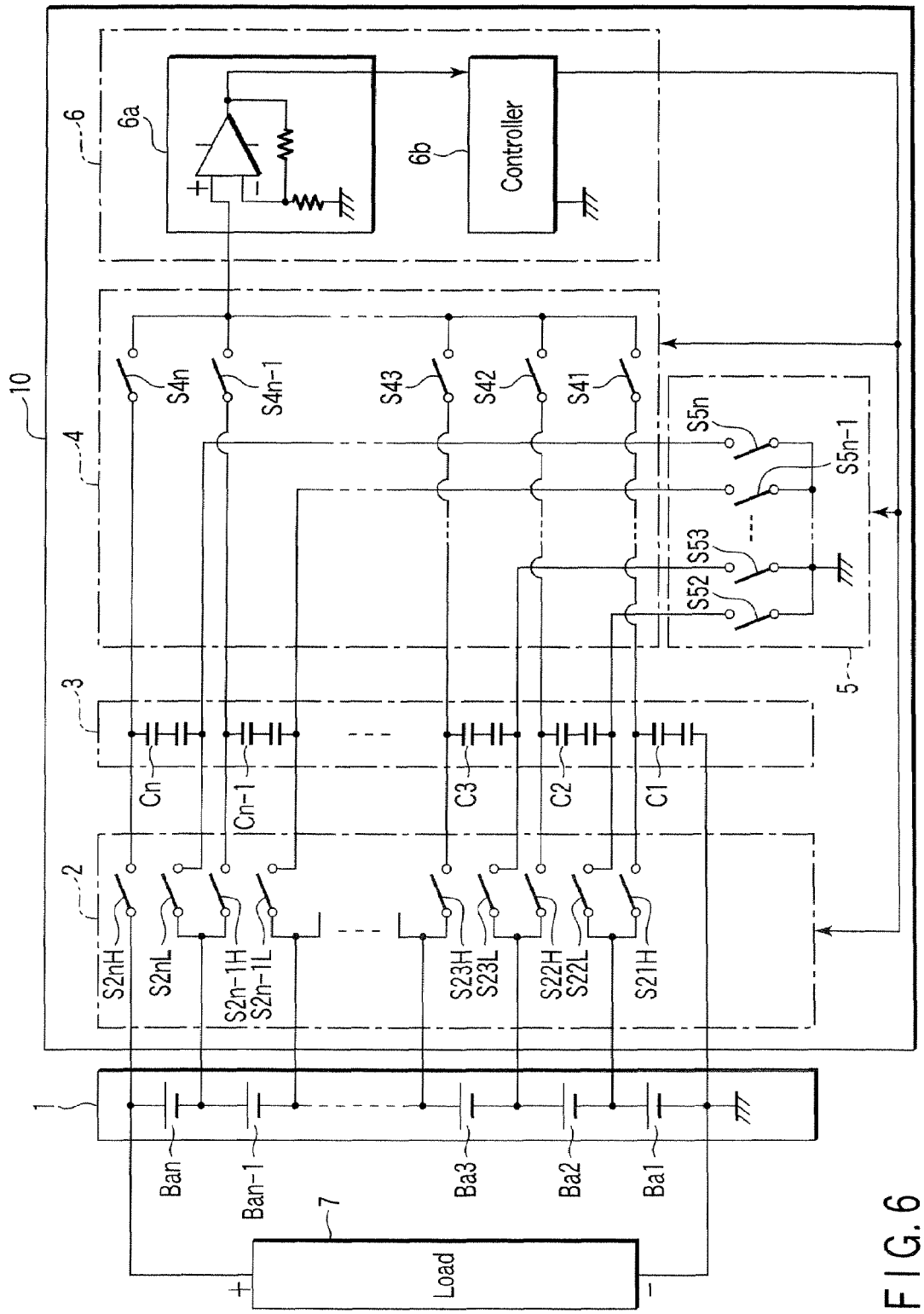
FIG. 6 shows a block diagram of a third embodiment according to the present invention.

FIG. 6 is a block diagram depicting an assembled battery voltage detecting apparatus 10 according to a third embodiment of the present invention.

With respect to constituent elements according to the third embodiment, the same constituent elements as those of the voltage detecting apparatus 10 according to the first embodiment shown in FIG. 1 are designated by the same reference numerals. A duplicate description thereof is omitted here.

The third embodiment is different from the first embodiment in the following. In the first embodiment, one capacitor C has been configured to be associated with one single battery Ba. In the third embodiment, paired capacitors C are configured so that two capacitors are connected in series to one single battery Ba.

According to the third embodiment, in the case where a short-circuit failure occurs with any of the two capacitors which configure one pair of capacitors C, such short-circuit can be avoided as long as the remaining one capacitor is normal. Thus, there can be provided a voltage detecting apparatus 10 in which there is reduced a failure probability such as heating, firing, and smoking of an assembled battery due to a short-circuit failure of the capacitor C.

Fourth Embodiment

Figure 7:
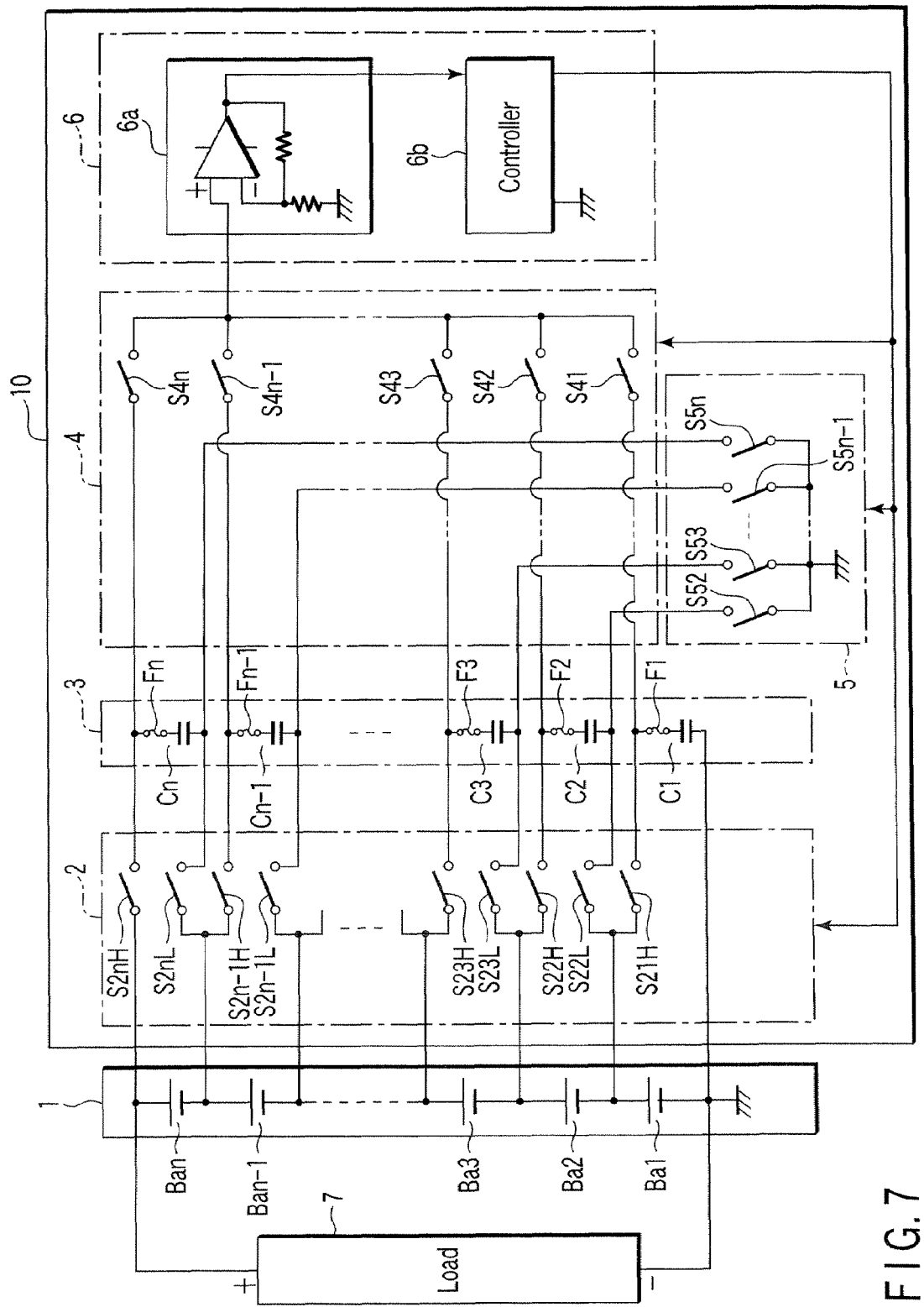
FIG. 7 shows a block diagram of a fourth embodiment according to the present invention.
Figure 8:
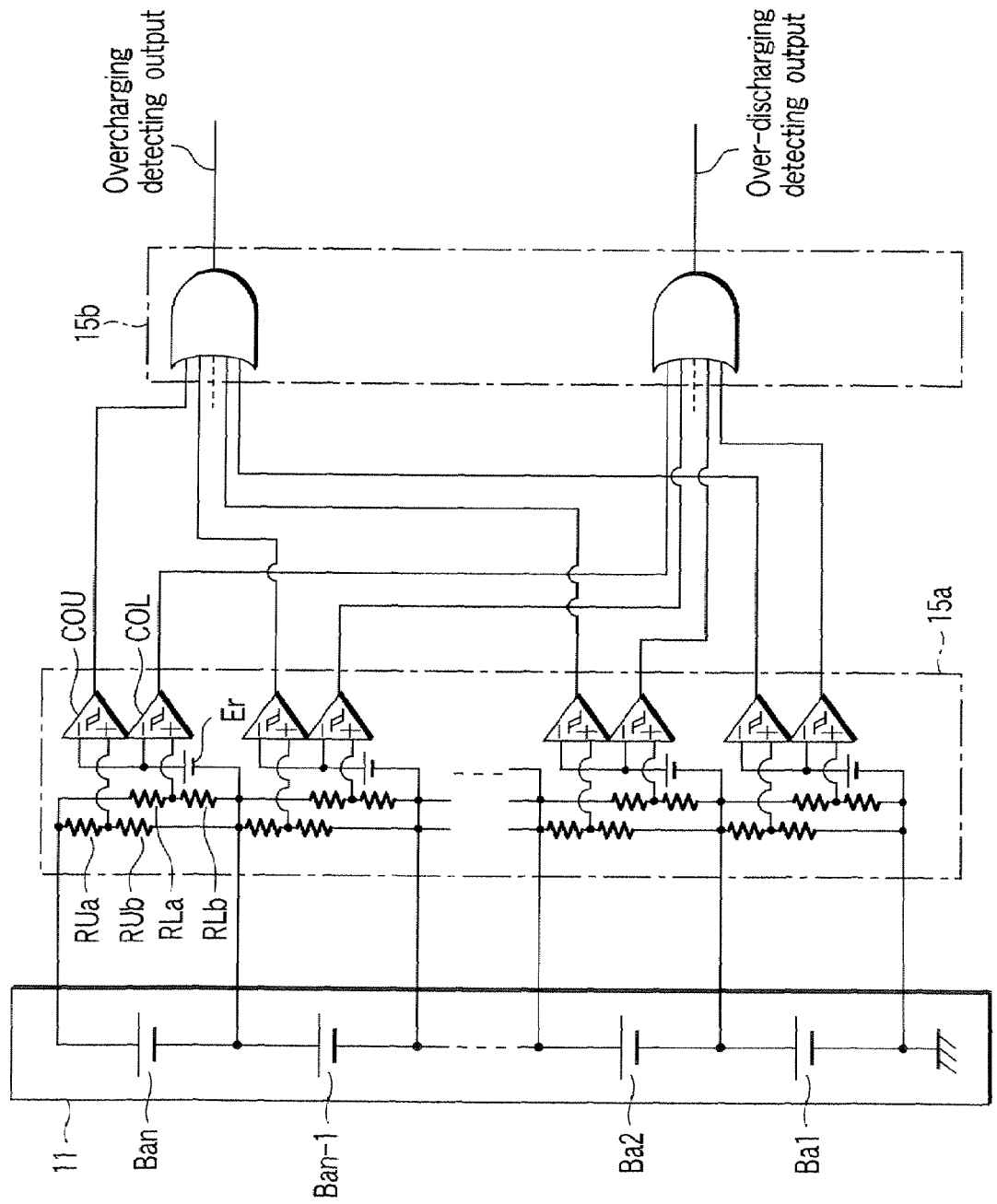
FIG. 8 shows a block diagram of a conventional overcharging or over-discharging detecting circuit.
Figure 9:
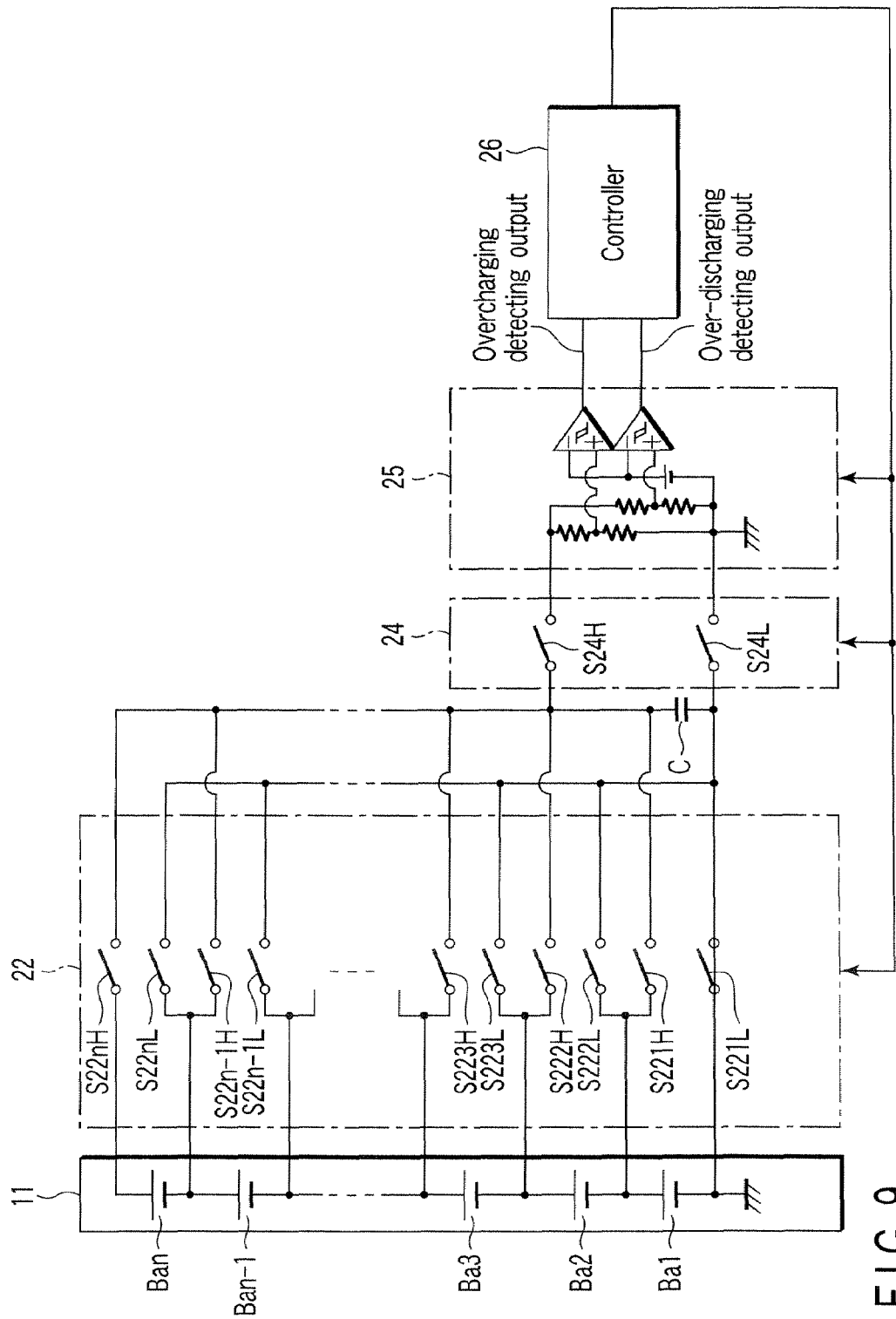
FIG. 9 shows a block diagram of a conventional capacitor system overcharging or over-discharging detection circuit.

FIG. 7 is a block diagram depicting an assembled battery voltage detecting apparatus 10 according to a fourth embodiment of the present invention.

With respect to constituent elements according to the fourth embodiment, the same constituent elements as those of the voltage detecting apparatus 10 according to the first embodiment shown in FIG. 1 are designated by the same reference numerals. A duplicate description thereof is omitted here.

The fourth embodiment is different from the first embodiment as in the following. In the first embodiment, one capacitor C is configured with respect to one single battery Ba. However, in the fourth embodiment, fuses F1 to Fn are connected in series with capacitors C1 to Cn.

According to the fourth embodiment, in the case where a short-circuit failure occurs with the capacitor C, each fuse F is blown out due to this short-circuit current. Therefore, with such a configuration, there can be provided a voltage detecting apparatus 10 capable of preventing a failure such as heating, firing, or smoking.

In addition, by grounding an input resistor of a buffer amplifier 6a with a high resistance Rh as shown in the figure, a voltage at a low ground potential is detected at a position at which a fuse F has blown, thus making it possible to specify a failure position of the capacitor C.

The present invention is not limited to the above-described embodiments. It is sufficient if the present invention is configured so as to charge single batteries in capacitors at the same time and to sequentially read out the charged voltages in the capacitors with respect to a reference potential fixed at a ground potential. Therefore, the present invention can be utilized as a voltage detecting apparatus for an assembled battery obtained by combining a variety of single batteries with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An assembled battery apparatus with a voltage detecting device, comprising:

an assembled battery including a plurality of single batteries connected in series;

a plurality of capacitors provided in pairs with the plurality of single batteries of the assembled battery, each of the capacitors being configured to be charged with a voltage of a respective single battery in the plurality of single batteries;

a plurality of sampling switches each of which is provided between a respective capacitor and single battery paired with the capacitor and between the other end of the capacitor and the other end of the single battery paired with the capacitor, such that each sampling switch is connected at a first end to a point connecting adjacent of the plural single batteries together and at a second end to a corresponding of the capacitors;

a plurality of transfer switches, each of which has one end connected to one end of the capacitor;

a plurality of reference electric potential setting switches, each of which is connected between the other end of the capacitor and a terminal of a ground potential; and a voltage detection control unit having a voltage input end connected to the other ends of the transfer switches to measure a voltage charged in each capacitor from the single battery via the sampling switch, the voltage detection control unit being configured to charge the plurality of capacitors with voltages of the single batteries through the sampling switches simultaneously, and to read individually the voltage charged in each of the capacitors in a state in which a lower electric potential side of the each capacitor is connected to the ground potential.

2. The assembled battery voltage detecting apparatus according to claim 1, wherein at least one of the each sampling switch and the each transfer switch is configured to include a pair of MOS type FETs having gate electrodes connected to each other, and connection points of the gate electrodes each are connected to a highest electric potential of the assembled battery via a resistor.

3. The assembled battery voltage detecting apparatus according to claim 2, wherein a sampling signal for making conductive the pair of MOS type FETs is supplied to the connection point of the gate electrodes at the time of sampling.

4. The assembled battery voltage detecting apparatus according to claim 3, wherein the pair of MOS type FETs are connected in series at reverse polarities.

5. The assembled battery voltage detecting apparatus according to claim 3, wherein the sampling signal has a sufficiently long time interval for absorbing dispersion in charging time constants among the plurality of capacitors.

6. The assembled battery voltage detecting apparatus according to claim 1, wherein capacitors provided in association with the single batteries are paired capacitors configured while two capacitors are connected in series.

7. The assembled battery voltage detecting apparatus according to claim 1, wherein capacitors provided in association with the single batteries are composite capacitors configured while one capacitor and a fuse are connected in series.

8. The assembled battery voltage detecting apparatus according to claim 1, wherein the capacitors are paired capacitors configured by connecting two capacitors in series.

9. The assembled battery voltage detecting apparatus according to claim 1, wherein fuses are configured to be connected in series by each of the capacitors.

10. The assembled battery apparatus with a voltage detecting device according to claim 1,
wherein;

one end of the capacitor corresponding to a lowest electric potential side of the assembled battery is connected to a grounding terminal of the voltage detecting apparatus;

the plurality of sampling switches are a plurality of single pole switches which switch only a high electric potential side of the each single battery, and then, carry out sampling at the each capacitor corresponding thereto; and the voltage detection control unit is configured to close the sampling switches, charge the each capacitor with a corresponding single battery voltage for a predetermined time at the same time, and then, open the sampling switches simultaneously and sequentially turn on the transfer switch and the ground potential setting switch from the capacitor corresponding to the lowest electric potential of the assembled battery so as to sequentially read voltages of the each single batteries.

11. The assembled battery voltage detecting apparatus according to claim 10, wherein the sampling switch is composed of a pair of MOS type FETs, and is configured so that source electrodes or drain electrodes thereof are connected to be opposed to each other at reverse polarities; gate electrodes of the pair of MOS type FETs are connected to each other; a connection point of the gate electrodes is connected to a highest electric potential of the assembled battery via a first resistor having a predetermined value; and gates of all MOS type FETs configuring the sampling switch are controlled to be switched at the same time, thereby sampling the each single battery voltage; and wherein the transfer switch is composed of a pair of MOS type FETs, and is configured so that source electrodes or drain electrodes thereof are connected to be opposed to each other at reverse polarities, each gate electrode of the each MOS type FET is connected in common to a highest electric potential of the assembled battery via a second resistor having a predetermined value, and gates of a pair of MOS type FETs configuring the each transfer switch are controlled to be sequentially switched.

12. The assembled battery voltage detecting apparatus according to claim 10, wherein the capacitors are paired capacitors configured by connecting two capacitors in series.

13. The assembled battery voltage detecting apparatus according to claim 10, wherein fuses are configured to be connected in series by each of the capacitors.

14. An assembled battery apparatus with a voltage detecting device, comprising:

an assembled battery including a plurality of single batteries connected in series;

a plurality of capacitors provided in pairs with the plurality of single batteries of the assembled battery;

a plurality of sampling switches connected between one end of the each capacitor and one end of the single battery paired with the capacitor and between the other end of the capacitor and the other end of the single battery paired with the capacitor, such that each sampling switch is connected at a first end to a point connecting adjacent of the plural single batteries together and at a second end to a corresponding of the capacitors;

a voltage detection control unit measuring a voltage charged in each capacitor from the single battery via the sampling switch;

a plurality of transfer switches, each of which is connected between one end of the capacitor and the voltage detection control unit; and a plurality of reference electric potential setting switches, each of which is connected between the other end of the capacitor and a terminal of a ground potential, wherein capacitors provided in association with the single batteries are composite capacitors configured while one capacitor and a fuse are connected in series.

15. The assembled battery apparatus with a voltage detecting device according to claim 14, wherein at least one of the each sampling switch and the each transfer switch is configured to include a pair of MOS type FETs having gate electrodes connected to each other, and connection points of the gate electrodes each are connected to a highest electric potential of the assembled battery via a resistor.

16. The assembled battery apparatus with a voltage detecting device according to claim 15, wherein a sampling signal to make conductive the pair of MOS type FETs is supplied to the connection point of the gate electrodes at the time of sampling.

17. The assembled battery apparatus with a voltage detecting device according to claim 16, wherein the pair of MOS type FETs are connected in series at reverse polarities.

18. The assembled battery apparatus with a voltage detecting device according to claim 16, wherein the sampling signal has a sufficiently long time interval for absorbing dispersion in charging time constants among the plurality of capacitors.

19. The assembled battery apparatus with a voltage detecting device according to claim 14, wherein capacitors provided in association with the single batteries are paired capacitors configured while two capacitors are connected in series.

20. An assembled battery apparatus with a voltage detecting device, comprising:

a plurality of capacitors provided in pairs with single batteries of the assembled battery made by connecting the single batteries in series;

a plurality of sampling switches connected between one end of the each capacitor and one end of the single battery paired with the capacitor and between the other end of the capacitor and the other end of the single battery paired with the capacitor;

a voltage detection control unit measuring a voltage charged in each capacitor from the single battery via the sampling switch;

a plurality of transfer switches, each of which is connected between one end of the capacitor and the voltage detection control unit; and a plurality of reference electric potential setting switches, each of which is connected between the other end of the capacitor and a terminal of a ground potential, wherein fuses are configured to be connected in series by each of the capacitors.

21. An assembled battery apparatus with a voltage detecting device, comprising:

an assembled battery including a plurality of single batteries connected in series;

a plurality of capacitors provided in pairs with and in identical number with each single battery of the assembled battery, the capacitors being charged to sample a voltage of the each single battery;

a plurality of sampling switches, each of which is provided between the single battery and the capacitor, the sampling switches sampling a voltage of the each single battery at the capacitor by switching a high electric potential side and a low electric potential side of the each single battery at the same time, such that each sampling switch is connected at a first end to a point connecting adjacent of the plural single batteries together and at a second end to a corresponding of the capacitors;

a transfer switch which, in a state in which each sampling switch is opened after the end of the sampling, individually switches and transfers a charge voltage of the each capacitor;

a reference electric potential setting switch which, in the case where a charge voltage of the each capacitor is transferred by means of the transfer switch, individually connects a lower potential side of the each capacitor to a reference electric potential terminal of the voltage detecting apparatus; and a voltage detecting unit controlling a switching timing of each switch of the sampling switch, the transfer switch, and the ground potential setting switch, and then, reading a charge voltage of the each capacitor, the charge voltage being transferred by the transfer switch, wherein fuses are configured to be connected in series by each of the capacitors.

22. The assembled battery apparatus with a voltage detecting device according to claim 21, wherein the respective capacitors are connected in series in identical number corresponding to the single batteries;

one end of the capacitor corresponding to a lowest electric potential side of the assembled battery is connected to a grounding terminal of the voltage detecting apparatus;

the sampling switches are a plurality of single pole switches which switch only a high electric potential side of the each single battery, and then, carry out sampling at the each capacitor corresponding thereto; and the voltage detecting unit is configured to close the sampling switch, charge the each capacitor with a single battery voltage for a predetermined time at the same time, and then, open the sampling switch and sequentially connect the transfer switch and the ground potential setting switch from the capacitor corresponding to a lowest one of the paired battery electric potentials so as to sequentially read voltages of the each single batteries.

23. The assembled battery apparatus with a voltage detecting device according to claim 21, wherein the sampling switch is composed of a pair of MOS type FETs, and is configured so that source electrodes or drain electrodes thereof are connected to be opposed to each other at reverse polarities; gate electrodes of the pair of MOS type FETs are connected to each other; a connection point of the gate electrodes is connected to a highest electric potential of the assembled battery via a first resistor having a predetermined value; and gates of all MOS type FETs configuring the sampling switch are controlled to be switched at the same time, thereby sampling the each single battery voltage; and wherein the transfer switch is composed of a pair of MOS type FETs, and is configured so that source electrodes or drain electrodes thereof are connected to be opposed to each other at reverse polarities, each gate electrode of the each MOS type FET is connected in common to a highest electric potential of the assembled battery via a second resistor having a predetermined value, and gates of a pair of MOS type FETs configuring the each transfer switch are controlled to be sequentially switched.

24. The assembled battery apparatus with a voltage detecting device according to claim 21, wherein the capacitors are paired capacitors configured by connecting two capacitors in series.

25. The assembled battery apparatus with a voltage detecting device according to claim 21, wherein fuses are configured to be connected in series by each of the capacitors.

26. The assembled battery apparatus with a voltage detecting device according to claim 1, wherein the sampling switches each includes a first switch and a second switch, the first switch being connected in parallel to one capacitor of the capacitors and one of the reference electric potential setting switches, and the second switch being connected in parallel to another of the capacitors adjacent to the one capacitor and one of the transfer switches.

27. The assembled battery apparatus with a voltage detecting device according to claim 1, wherein the sampling switches each being configured with a single switch, the plurality of capacitors are electrically connected in series, and the single switch is connected in parallel with one of the transfer switches and one of the reference electric potential setting switches.

* * * * *